United States Patent [19]

Nielson

[11] 3,917,910

[45] Nov. 4, 1975

[54] CIRCUITRY FOR PROVIDING CALL OVERRIDE IN A PBX SYSTEM IN ACCORDANCE WITH A SUPPLIED CLASS OF SERVICE

[75] Inventor: Carl Calvin Nielson, Boulder, Colo.

[73] Assignee: Bell Telephone Laboratories, Incorporated, Murray Hill, N.J.

[22] Filed: Oct. 3, 1974

[21] Appl. No.: 511,754

[52] U.S. Cl. .............................................. 179/18 BH

[51] Int. Cl.$^2$ .............................................. H04M 3/20

[58] Field of Search ...................... 179/18 BH, 18 D

[56] References Cited

UNITED STATES PATENTS 2,823,264 2/1958 Pharis ............................ 179/18 BH 3,410,960 11/1968 Erwin et al. .................... 179/18 BH

*Primary Examiner*—William C. Cooper

*Attorney, Agent, or Firm*—C. S. Phelan

[57] ABSTRACT

In a telephone switching system wherein a plurality of line circuits are terminated in station sets, the line circuits are interconnectable to a plurality of trunk circuits through a multistage switching network. A call originated by a calling party to a called party, engaged in a conversation with a third party, is completed by overriding the conversation between the called party and the third party provided both the calling party and the called party are equipped with a class of service which permits call override. Call override is initiated by the calling party upon receipt of a special busy signal by a flashing of his switchhook.

10 Claims, 4 Drawing Figures

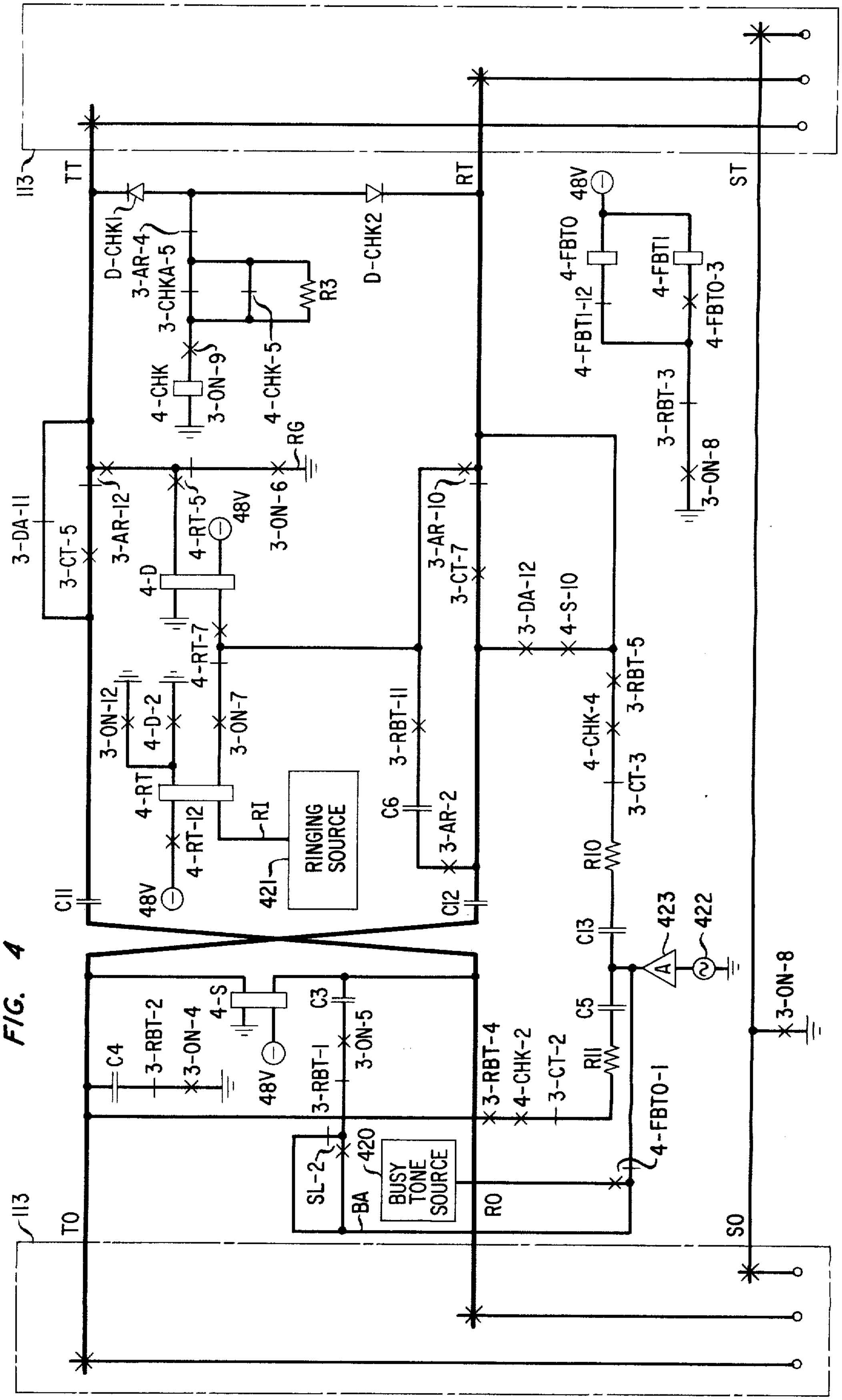
F/G. 4

CIRCUITRY FOR PROVIDING CALL OVERRIDE IN A PBX SYSTEM IN ACCORDANCE WITH A SUPPLIED CLASS OF SERVICE

BACKGROUND OF THE INVENTION

1. Field of the Invention

This invention relates to Private Branch Exchange (PBX) switching systems and, in particular, to circuitry for providing call override or butt-in capability.

2. Description of the Prior Art

In prior art PBX systems the ability of a calling party to override a conversation between a called party and a third party required the calling party, upon receipt of a busy tone, to hang up and then dial a special override code followed by the directory number of the busy called party. One of the disadvantages in implementing call override in this manner is that the calling party must first hang up upon receipt of the busy tone. Another disadvantage is that special circuitry must be provided in the PBX to recognize the special code required to initiate a call override sequence. A third disadvantage is that the calling party must redial the directory number of the busy called party once the PBX system has been alerted that a call override request has been made.

These disadvantages have been substantially circumvented by the call override circuitry disclosed in the copending application of E. W. Sobanski Case 2, filed concurrently with this application. However, the call override circuitry as disclosed by Sobanski has a disadvantage in that once a request for call override is made the called party's conversation can be overridden regardless of whether or not the called party is in a class of subscribers who allow their calls to be overridden. For example, a junior executive in a corporation could override a call between the president of the corporation and a third party so long as the junior executive is provided with a class of service which allows him to override established calls. Quite obviously, call override service implemented in this manner suffers a serious drawback from the corporate president's point of view.

Accordingly, it is one object of the present invention to implement a call override feature which is dependent upon the class of service provided to both the calling and called parties.

Another object is to provide call override service in accordance with a hierarchical arrangement whereby various grades of call override service are available to a broad range of possible users.

Yet another object of the present invention is to refrain from implementing a call override connection to a busy called party until his class of service has been ascertained and adequate warning has been given that his call to the third party is about to be overridden.

Still another object is to ensure the privacy of the conversation between the calling party and the called party and, the privacy of the conversation between the third party and the called party by supplying a call override warning signal to both the called party and the third party.

SUMMARY OF THE INVENTION

These and other objects of the invention are realized in accordance with an illustrative embodiment of a telephone switching system having a plurality of line circuits terminated in station sets wherein the line circuits are interconnectable to a plurality of trunk circuits through a multistage switching network. Any calling station is able to override a connection between a busy called station and a third party station provided the calling station is supplied with a class of service which permits call override and the called station is supplied with a class of service which allows call override. Following detection of the class of service supplied to the calling station, a busy/idle check and a class of service check are made of the called station. If the called station is busy and is equipped with a class of service which allows its calls to be overridden, a call override trunk is seized and a special busy signal is returned to the calling station. Actuation of the call override sequence is initiated by a switchbox flash at the calling station. In response to the switchhook flash, a call override warning signal is supplied to both the called station and the third party station and a similar signal acknowledging the request for call override is returned to the calling station.

Accordingly, it is one feature of the present invention that a class of service check of the calling station, a busy/idle check, and a class of service check of the called station are made before a call override trunk is seized.

Another feature of the present invention is that a connection is established through the network from an entitled calling station to the call override trunk and through the network from the call override trunk to an entitled called station in response to the detection of a busy condition of the entitled called station.

A further feature is that a switchhook flash by the entitled calling station following the receipt of the special busy signal is recognized as an override request signal by the override trunk and enables the trunk thereby establishing a call override connection between the entitled calling station and the busy entitled called station.

Still another feature is that a call override warning signal is supplied to the entitled called station and the third party station and a similar signal acknowledging acceptance of the call override request is supplied to the entitled calling station prior to cut through of the call override talking path connection.

Yet another feature of the present invention is that a ringing signal is supplied to the entitled called station if the called station goes idle before switchhook flash by the entitled calling station.

DESCRIPTION OF THE DRAWINGS

These and other objects and features of the invention will become more apparent upon consideration of the following detailed description and appended claims in connection with the attached drawings of an illustrative embodiment in which:

FIGS. 3 and 4, when FIG. 4 is placed adjacent to the bottom of FIG. 3, is an illustrative embodiment of a call override trunk circuit.

DETAILED DESCRIPTION

Figure 2:
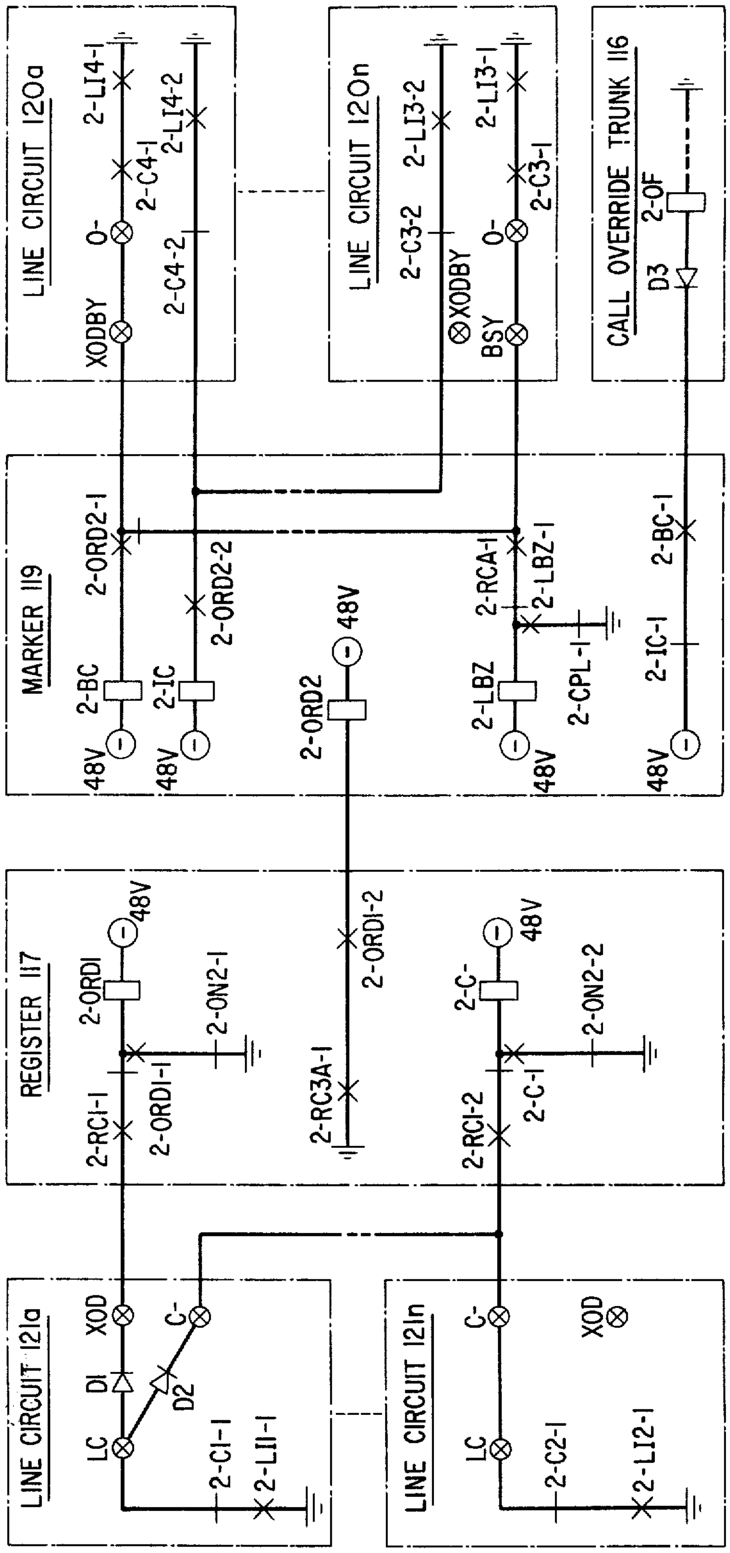
FIG. 2 is a detached contact schematic illustrating the manner in which the class of service of the calling and called station is determined and the call override trunk is seized.
Figure 3:
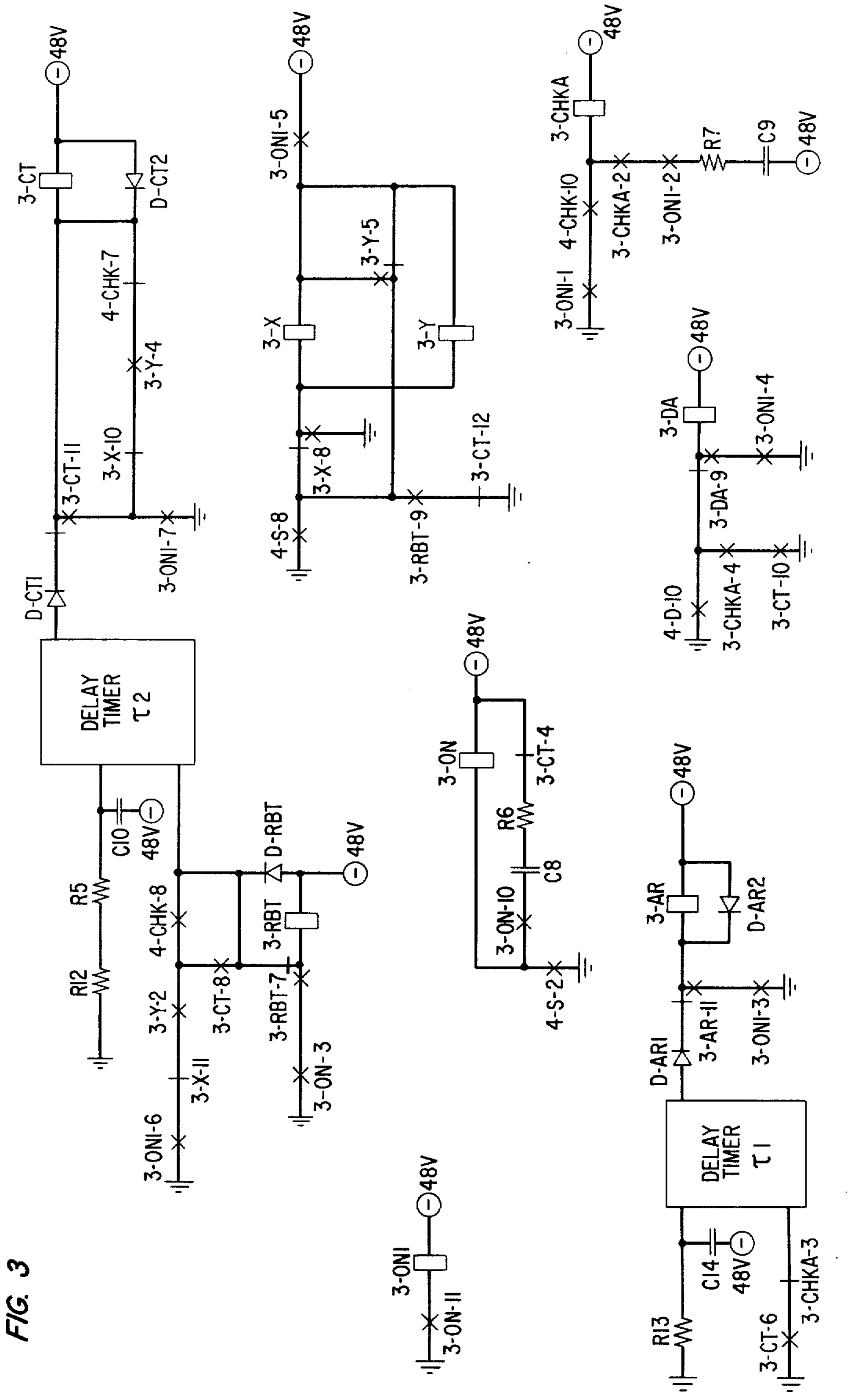

It should be noted that FIGS. 2 through 4 employ a type of notation referred to as "detached contact" in which an "X", shown intersecting a conductor, represents a normally open contact of a relay and a bar, shown intersecting a conductor at right angles, represents a normally closed contact of a relay; "normally" referring to the unoperated condition of the relay. The principles of this type of notation are described in an article entitled "An Improved Detached Contact Type Schematic Circuit Drawing" by F. T. Meyer in the September 1955 publication of the American Institute of the Electrical Engineers Transactions, Communications and Electronics, Vol. 74, pages 505–513.

It should be noted also that in order to simplify the disclosure and thus facilitate a more complete understanding of the embodiment, relays, relay contacts and other electromechanical devices, shown in FIGS. 2 through 4, have been given systematic designations. Thus, the number preceding the letter designation of each device corresponds to the figure in which the control circuit of the device is shown. For example, the control circuit for relay BC is shown in FIG. 2, and therefore, relay BC is referred to as 2–BC. Each relay contact, whether make, break or transfer, is shown with its specific contact number preceded by the designation of the relay to which it belongs. As an example, the notation 3–X–8 indicates contact number 8 of the X relay, the control circuit of which is shown in FIG. 3.

1.1 General Description

Figure 1:
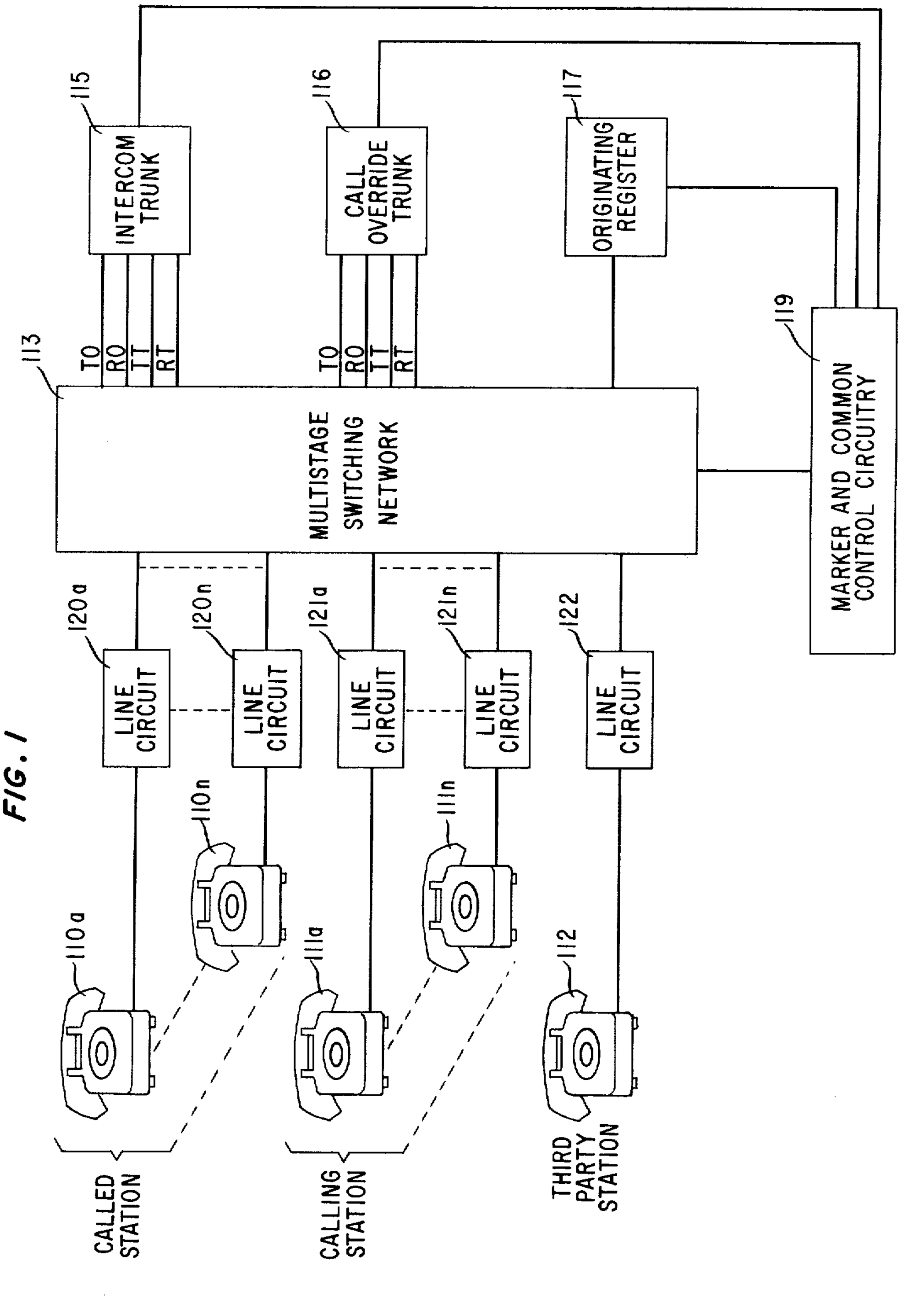
FIG. 1 is a generalized schematic representation of a network connection for providing call override.

It should be noted, as shown in FIG. 1, that a number of called stations 110*a* through 110*n* and a number of calling stations 111*a* through 111*n* are connected to a multistage switching network 113 through line circuits 120*a* through 120*n* and through line circuits 121*a* through 121*n*, respectively. Also connected to the multistage switching network 113 is a third party station 112. The third party station 112 also connects through a line circuit 122. It is to be appreciated that each of the called stations 110*a* through 110*n* may also be used, at some point in time, as a calling station. Similarly, each of the calling stations 111*a* through 111*n* may, at some point, function as a called station. Accordingly, each station has a double class of service associated therewith. For example, called station 110*a* may have a class of service which allows calls placed to it to be overridden, as well as having a capability to override calls placed from that station. This double class of service arrangement gives rise to a hierarchical call override organization whereby various grades of call override service are available.

For instance, in a corporate environment a given station utilized by a clerk may be denied the ability to override calls but may have calls placed to it overridden. A station utilized by a junior executive in the corporation may have the capability to override calls but also have the capability of having calls placed to it capable of being overridden. A station utilized by an individual in the personnel organization may be equipped with class of service which does not permit it to override calls and also does not allow calls placed to it to be overridden, for example, by the junior executive. Finally, the station utilized by the corporate president may have the capability to override calls to other stations but it does not allow calls placed to it to be overridden. For purposes of this description, the calling station 111*a* is assumed to have a class of service which permits it to effect call override. Calling station 111*n* is assumed to have a class of service which does not permit it to effect call override. Correspondingly, called station 110*a* is assumed to have a class of service which permits calls placed to it to be overridden and, called station 110*n* is assumed to have a class of service which does not permit calls placed to it to be overridden.

Before a call override feature takes on any significance there must be a connection between one of the called stations 110, say 110*a*, as shown in FIG. 1, and the third party station 112. This interconnection is effected through an intercom trunk 115 and the multistage switching network 113 operating under the control of a marker 119 in a manner, for example, similar to that set out at column 18 et seq. of H. H. Abbott et al. U.S. Pat. No. 2,949,506 issued Aug. 16, 1960.

When the calling station 111*a*, which is assumed to be provided with a class of service which allows call override, attempts to place a similar call to the called station 110*a*, which is assumed to be provided with a class of service which permits calls placed to it to be overridden, the calling station 111*a*, upon detection of the busy condition of the called station 110*a* by the marker 119, is connected to a call override trunk circuit 116. Ascertainment of whether the calling station 111*a* has the requisite class of service to allow call override is effected by class of service check circuitry partially located in an originating register 117 and partially located in the marker 119. The determination of the class of service of the called station 110*a*, on the other hand, is implemented by the marker 119. In addition to the class of service check, a busy/idle check of the called station 110*a* is made by the marker 119. If the called station 110*a* is busy and is equipped with a class of service which allows call override, the marker 119 seizes an idle call override trunk 116.

Upon the seizure of the call override trunk 116 a special busy signal is returned through the trunk circuit to the calling station 111*a*. A request for implementation of the call override feature is made by the calling station 111*a* by a flashing of its switchhook. Upon receipt of the switchhook flash signal the override trunk circuit 116 is connected to the entitled called station 110*a*. Just prior to completion of a talking path between the calling station 111*a* and the called station 110*a* a three second tone is supplied to all stations which are still part of the connection, that is, called station 110*a*, calling station 111*a* and the third party station 112. At the end of this three second tone a talking path between the calling station 111*a* and the called station 110*a* is completed regardless of the action taken at the third party station 112. If the called station 110*a* goes idle after the switchhook flash by the calling station 111*a*, but prior to receiving the three second tone, a ringing signal is supplied to the called station 110*a* to alert it that an incoming call is being made.

1.2 Calling Station Class of Service Check

Call override capability is provided only to those calling stations 111 which have been supplied with a class of service which permits call override. A check of the call override class of service of the calling station 111 is effected by circuitry of the type shown in FIG. 2. When a calling station 111 goes off-hook a switchhook contact (not shown) is closed. This contact closure activates a line relay, similar to line relay L30 shown in FIG. 35 of the aforementioned Abbott et al. patent, in line circuit 121 and provides a service request indication to the marker 119, as shown in FIG. 1, for an idle register of the type illustrated by originating register 117. All of the foregoing actions occur whenever a calling station 111 in a PBX system goes off-hook, as set out in the previously mentioned Abbott et al. patent, and are included in this description only for purposes of illustrating how an idle register 117 is seized for a calling station 111.

With the marker 119 having found an idle register 117, the class of service of the calling station 111 is forwarded to the register 117 and, in turn, is passed to the marker 119. An illustration of the method in which the class of service information is routed to the marker 119 is shown in FIG. 2 in simplified form. For the case where the calling station 111 is not provided with a call override class of service, that is, calling station 111*n*, there is no strapping between a line class crosspoint LC and an override crosspoint XOD. The absence of the call override class of service is noted by the nonactuation of a relay 2–ORD1. In this instance calling station 111*n* is provided with the normal class of service an indication of which is transmitted to the register 117 by providing a ground potential to actuate a relay 2–C–. This ground potential is routed from line circuit 121*n* through a normally open contact 2–LI2–1, a normally closed contact 2–C2–1, a normally open contact 2–RC-1–2 and a normally closed contact 2–C–1. The relay 2–C– is held operated via a ground lock path containing a normally closed contact 2–ON2–2 and a normally open contact 2–C–1. Since the calling station 111*n* is not provided with a call override class of service, call connections from this station are of no further interest in the present context.

In the case where the calling station 111 is provided with a call override class of service, that is, calling station 111*a*, a connection between line class crosspoint LC and an override crosspoint XOD is completed through a diode D1. The call override class of service information is supplied to the register 117 by the actuation of the 2–ORD1 relay. This actuation is effected by supplying a ground to the relay 2–ORD1 through a path containing a normally open contact 2–LI1–1, a normally closed contact 2–C1–1, a line isolation diode D1, a normally open contact 2–RC1–1 and, a normally closed contact 2–ORD1–1. Relay 2–ORD1 is held operated via a ground lock path containing a normally closed contact 2–ON2–1 and normally open contact 2–ORD1–1. In addition to the call override class of service which is supplied to the calling station 111*a*, a regular class of service is also supplied thereto. This class of service indication is transmitted to the register 117 by the actuation of the 2–C– relay by the application of a ground potential over a path containing normally open contacts 2–LI1–1 and 2–RC1–2, normally closed contacts 2–C1–1 and 2–C–1 and, a line isolation diode D2. As was the case with calling station 111*n* which was supplied with a class of service other than a call override class of service, the other class of service supplied to calling station 111*a*, is of importance when the called station 110 is idle and the call is completed through the intercom trunk 115, but it is of no further interest in the present context and, additional discussion with respect thereto is unnecessary.

It should be noted that the normally open contacts 2–LI1–1 and 2–RC1–1 and the normally closed contact 2–C1–1 are part of a line identification relay, a line cutoff relay and a register connect relay, respectively, and are utilized in any type of PBX connection and, therefore, are included in this description for illustrative purposes only, since they form no essential part of the present invention.

With the actuation of the relay 2–ORD1 the call override class of service of the calling station 111*a* is passed to the originating register 117. This class of service is transmitted to the marker 119 by the actuation of a relay 2–ORD2. At this point dial tone is returned to the calling station 111*a* and the directory number of a called station 110 is dialed. Subsequent to the completion of dialing the marker 119 responds to the originating register bid and reads the calling station 111 class of service. The ground operate path for the relay 2–ORD2 includes normally open contacts 2–RC2A–1 and 2–ORD1–2, the latter contact being closed upon the actuation of the relay 2–ORD1.

1.3 Busy/Idle Check and Class of Service Check of Called Station

When the directory number of the called station 110 (called station 110 including any of the called stations 110*a* through 110*n*) has been dialed, a dial complete bid is forwarded from the register 117 to the marker 119. The dial complete bid recalls the marker 119 in order to perform a busy/idle check of the called station 110. Busy verification checks are well documented in the prior art of which the E. L. Erwin et al. U.S. Pat. No. 3,410,960, issued Nov. 12, 1968 is an example. Accordingly, only a simplified version is included in the present disclosure for illustration purposes.

As was the case with the calling stations 111 in the illustrative example, one of the called stations 110 is supplied with a class of service which allows call override and one of the stations is provided with a class of service which does not permit call override. Called station 110*a*, because of the strapping between a O- crosspoint and an XODBY crosspoint, illustrates the former. Called station 110*n*, because the O- crosspoint is not strapped to the XODBY crosspoint, illustrates the latter. If the calling station 111*a* attempts to reach the called station 110*n* and this station is busy, the busy/idle check performed by the marker 119 will result in the actuation of a line busy relay 2–LBZ. Actuation of the relay 2–LBZ causes the marker 119 to seize a busy tone trunk (not shown) and a normal busy signal is returned to the calling station 111*a*. The operate path for the relay 2–LBZ includes normally open contacts 2–LI-3–1, 2–C3–1 and 2–RCA–1 and a normally closed contact 2–LBZ–1. Relay 2–LBZ is held operated by a ground path including a normally closed contact 2–C-PL–1 and a normally open contact 2–LBZ–1.

Since the called station 110*n* is busy its line cutoff relay will be actuated and a normally closed contact 2–C3–2 will be opened thereby breaking the ground path to an idle check relay 2–IC. Because called station 110*n* has a class of service which precludes call override it is of no further interest in the present context and further discussion with regard thereto is unnecessary.

Assuming that calling station 111*a* is attempting to reach called station 110*a* and, recalling that called station 110*a* is provided with a class of service which allows its calls to be overridden, the busy/idle check and class of service check performed by the marker 119 results in the detection of the busy condition and the call override class of service. The detection of these two conditions results in the seizure of an idle call override trunk circuit 116.

Transmission of the call override class of service from the called station 110*a* to the marker 119 is effected by the actuation of a busy check relay 2–BC.

The ground operate path for the actuation of the relay 2–BC includes normally open contacts 2–LI4–1, 2–C-4–1 and 2–ORD2–1. Since called station 110*a* is busy its line cutoff relay will be actuated and the ground path to operate the idle check relay 2–IC is opened and, hence, the 2–IC relay remains in a normal condition.

1.4 Override Trunk Circuit Seizure

Following the busy/idle check and the class of service check, the marker 119 will either seize the call override trunk 116 if the called station 110*a* is busy or, if the called station 110*a* is idle the intercom trunk 115 will be seized to complete the connection. This latter connection is of no further interest in this context and will not be pursued farther. For the situation where the called station 110*a* is busy the 2–BC relay is actuated causing a normally open contact 2–BC–1 to close. In addition, if the called station 110*a* is busy, the idle check relay 2–IC is not actuated and its normally closed contact 2–IC–1 remains closed. With the states of these two relays being as noted, a battery potential of –48 volts is applied to the override trunk circuit 116 through a line protection diode D3 to a 2–OF relay thereby actuating it and seizing the override trunk 116.

1.5 Path Completion to Calling Station

Subsequent action by marker 119 results in an idle path through the multistage switching network 113 being selected and a signaling path being completed to the calling station 111*a*. Completion of this path subjects the calling station 111*a* to the control of a supervisory relay 4–S, as shown in FIG. 4. Actuation of the supervisory relay 4–S is effected by completion of a loop through the calling station 111*a* via a ring lead RO and a tip lead TO. The operation of relay 4–S via the tip and ring crosspoint connection to the calling station loop provides talking battery to the calling station 111*a*.

In addition to the foregoing, operation of relay 4–S causes an off normal relay 3–ON, shown in FIG. 3, to be actuated by application of ground through a normally open contact 4–S–2. Operation of relay 3–ON closes a normally open contact 3–ON–10 closing a resistive-capacitive slow release loop around relay 3–ON. The resistive-capacitive loop is comprised of a resistor R6 and a capacitor C8 which had values of 1500 ohms and 200 microfarads, respectively. A normally closed contact 3–CT–4 is included in the slow release loop for disabling it during other operations of relay 3–ON.

1.6 Path Completion Through Override Trunk to Called Station

A path through the override trunk 116 to the called station 110*a* is completed by a sequence of relay actuations to effect the cut through of the connection between calling station 111*a* and called station 110*a*. This sequence of actuations is initiated by the operation of relay 3–ON which closes a normally open contact 3–O-N–11 and allows ground to be applied to a 3–ON1 relay, thereby operating it. Operation of the 3–ON relay also closes a normally open contact 3–ON–8, as shown in FIG. 4, and grounds paths SO and ST.

Operation of the 3–ON relay also closes a path through a normally open contact 3–ON–5 in a lead BA, as shown in FIG. 4, to provide a special busy signal derived from a busy tone source 420 and a 440 Hertz tone produced by tone source 422 and amplifier 423. This special signal is supplied to the calling station 111*a* over the tip and ring leads TO and RO, respectively, by alternate application of the two signals through relay contact 4–FBT0–1. Alternate operation of relay contact 4–FBTO–1 results from relays 4–FBT0 and 4–FBT1 being connected as a relay multivibrator of a type well known in the art. The relay multivibrator operates when normally open contact 3–ON–8 is closed and normally closed contact 3–RBT–3 remains closed. A capacitor C3 is included in the busy signal path for DC isolation purposes. In addition to the foregoing, operation of the relay 3–ON prepares an operate path for a relay 4–CHK by closing a normally open contact 3–ON–9.

With the actuation of the relay 3–ON1, as shown in FIG. 3, a flash detect relay 3–X is operated with ground being applied to one side of the 3–X relay via a normally open contact 4–S–8 and a normally closed contact 3–X–8 with the battery potential being supplied to the 3–X relay through a normally open contact 3–ON1–5. Operation of the 3–X relay is held locked through a normally open contact 3–X–8. The operation of the 3–ON1 relay also prepares an operate path for a relay 3-CHKA by closing a normally open contact 3–ON1–1.

Operation of relay 3–ON1 provides a holding ground for relays 3–CT, 3–DA, and 3–AR by closing normally open contacts 3–ON1–7, 3–ON1–4, and 3–ON1–3, respectively. Furthermore, a ground start path for a delay timer $\tau 2$ is prepared by closure of a normally open contact 3–ON1–6.

A tip and ring crosspoint connection to the called station 110*a*, as shown in FIG. 4, provides battery to the relay 4–CHK over either a tip lead TT or a ring lead RT through line isolation diodes D–CHK1 or D–CHK2, respectively. The battery path to the relay 4–CHK is completed through a pair of normally closed contacts 3–A-R–4 and 4–CHK–5 and normally open contact 3–ON–9 which had been previously closed. A resistor R3, connected across normally closed contact 4–CHK–5, keeps the current flow at a level just sufficient to maintain actuation of the relay 4–CHK following its initial operation. Minimization of the current flow is necessary if the drain on the called station loop is to be kept at a low level. A resistance value for resistor R3 of 19.1 kilohms has been found suitable for this purpose.

In summary, the foregoing relay actuations have prepared a path through the override trunk circuit 116 for completion of an override connection between the entitled calling station 111*a* and the busy entitled called station 110*a*.

1.7 Calling Station Enables Override

Actual cut through of the calling station 111*a* to the busy called station 110*a* occurs in response to a switchhook flash at the calling station 111*a*. When the calling station 111*a* provides a switchhook flash, the busy signal path BA to the calling station 111*a* is opened and a 440 Hertz tone is supplied to both the calling station 111*a* and called station 110*a*. The 440 Hertz tone continues for about three seconds, after which the connection between the calling station 111*a* and the busy called station 110*a* is cut through.

Flashing of the switchhook at the calling station 111*a* causes the supervisory relay 4–S to release which, in turn, removes a shunt ground applied to a relay 3–Y through normally open contact 4–S–8 and normally closed contact 3–Y–5, as shown in FIG. 3. Removal of the shunt ground from relay 3–Y allows it to operate with battery potential being supplied through the normally open contact 3–ON1–5 which was previously closed by operation of the 3–ON1 relay. If the calling station 111*a* returns to an off-hook condition within approximately 1.2 seconds of depression of the switchhook for a flash, the supervisory relay 4–S reoperates via the held crosspoint connection to the calling station loop. The 1.2 second time interval is controlled by the resistor R6 and the capacitor C8 across the control winding of relay 3–ON. Insertion of resistor R6 and capacitor C8 into the control winding of relay 3–ON is implemented by closure of the normally open contact 4–S–2. The reoperation of relay 4–S causes relay 3–X to be released while relay 3–Y remains in an operated condition.

With relay 3–Y operated a ground path is completed to a relay 3–RBT through normally open contacts 3–ON1–6, 3–Y–2, and 4–CHK–8 and normally closed contacts 3–X–11 and 3–RBT–7. The operation of relay 3–Y also provides a ground to the input of delay timer $\tau2$ and it maintains a release shunt path for relay 3–X by placing a ground potential on both sides of the relay 3–X.

Operation of the relay 3–RBT opens the busy signal path BA to the calling station 111*a*, as shown in FIG. 4, by opening a normally closed contact 3–RBT–1. The ground return path for the busy signal, comprising a normally open contact 3–ON–4, a normally closed contact 3–RBT–2 and a capacitor C4, is also opened by the opening of the normally closed contact 3–RBT–2. Capacitor C4 provides an AC ground return path and in the preferred embodiment had a value of 0.1 microfarads. At the same time, a 440 Hertz tone, generated by oscillator 422 and level controlled by amplifier 423, is transmitted to both the calling station 111*a* and the called station 110*a*. The 440 Hertz tone applied to the calling station 111*a* is over a path containing a capacitor C5, a resistor R11, a normally closed contact 3–CT–2, and a pair of normally open contacts 4– CHK–2 and 3–RBT–4. Similarly, the 440 Hertz tone applied to the called station 110*a* is over a path containing a capacitor C13, a resistor R10, a normally closed contact 3–CT–3, and a pair of normally open contacts 4–CHK–4 and 3–RBT–5. Resistors R10 and R11 and capacitors C5 and C13 provide tone level control and DC isolation, respectively, in the 440 Hertz tone path. In one embodiment the resistors R10 and R11 had values of 10 kilohms and the capacitors C5 and C13 had values of 0.04 microfarads.

With the input to the delay timer $\tau2$ grounded by the closure of normally open contact 3–Y–2, as shown in FIG. 3, a ground is supplied to one side of the relay 3–CT through a path containing a transient protection diode D–CT1 and a normally closed contact 3–CT–11. The other side of relay 3–CT is held at battery potential of −48 volts. With the operation of the 3–CT relay, the 440 Hertz tone to the calling station 111*a* and called station 110*a* is removed by opening normally closed contacts 3–CT–2 and 3–CT–3 in the 440 Hertz tone path.

It should be noted that the operation of the relay 3–CT is delayed by a fixed time interval, which in one embodiment is approximately three seconds. This three-second time delay, during which the 440 Hertz tone is supplied to both the calling station 111*a* and called station 110*a*, gives both stations an adequate warning that call override is to take place. Since the third party connection to the called station 110*a* is still up, the three-second warning is also supplied to the third party station 112 providing the third party with an indication that his conversation with the called party is about to be overridden. The length of the aforementioned warning time interval is controlled by the delay timer $\tau2$ with resistors R5 and R12 and capacitor C10 providing a fine adjustment of the selected delay. For the three-second warning embodiment R5 had a value of 2 microfarads.

Following removal of the 440 Hertz tone the calling station 111*a* and called station 110*a* are connected together via paths containing coupling capacitors C11 and C12, a pair of normally open contacts 3–CT–5 and 3–CT–7, and a pair of normally closed contacts 3–AR–12 and 3–AR–10, respectively. At this time a talking path is established between the calling station 111*a* and called station 110*a* and no further trunk circuit action occurs until either station disconnects.

It should be noted that one other function implemented by the operation of the relay 3–CT is that the slow release loop around the relay 3–ON is broken, thereby descreasing its release time.

1.8 Called Station Goes Idle Subsequent to Enablement of Override

When the calling station 111*a* initiates a switchhook flash, the call override trunk 116 functions as described at the beginning of Section 1.7 in that the supervisory relay 4–S releases with the relay 3–Y being subsequently operated. In the situation where the called station 110*a* goes idle subsequent to override enablement the relays 4–CHK and 3–CHKA are released and the relay 3–CT is operated via a path containing normally closed contacts 3–X–10 and 4–CHK–7, and normally open contacts 3–ON1–7 and 3–Y–4. A diode D–CT2 is connected across the winding of the relay 3–CT for protection against transient voltages generated by relay contact closures. An operate lock path for relay 3–CT is provided through normally open contacts 3–ON1–7 and 3–CT–11.

The operation of the relay 3–CT opens the 440 Hertz tone path to prevent tone application prior to ringing the called station 110*a*. With the relay 3–CT operated, ground is applied to an input of a delay timer $\tau1$ through a normally open contact 3–CT–6 and a normally closed contact 3–CHKA–3. Delay timer $\tau1$ regulates the time interval before application of a ringing signal. In one embodiment of the invention this time interval was advantageously selected to be approximately 3 seconds. Fine adjustment of this delay interval is controlled by a resistor R13 and a capacitor C14 which, for the aforementioned embodiment, had values of 3.0 megohms and 2 microfarads, respectively.

After the 3 second delay interval, a ground is delivered through a transient protection diode *D*–AR1 and a normally closed contact 3–AR–11 to one side of the relay 3–AR the other side of which is held at battery potential of −48volts. An operate lock path for relay 3–AR is provided bynormally open contacts 3–ON1–3 and 3–AR–11. A diode D–AR2 is connected across the winding of the relay 3–AR for protection against transient voltages generated by relay contact closures.

With the relay 3–AR operated a ringing signal supplied by a ringing source 421 is applied, as shown in FIG. 4, via a lead RI through a winding of a relay 4–RT and thence through a normally open contact 3–ON–7, a normally closed contact 4–RT–7, and a normally open contact 3–AR–10 to the called station 110*a*.

Ground return for the ringing signal by way of a lead RG is through the crosspoint connection of the called station 110*a* to the override trunk 116 and back through a normally open contact 3–AR–12, a normally closed contact 4–RT–5, and a normally open contact 3–ON–6. Operation of the relay 3–AR also opens the operate path for relay 4–CHK by breaking the normally closed contact 3–AR–4 and provides a ringback signal to the calling station 111*a* via capacitors C6 and C12 and a pair of normally open contacts 3–RBT–11 and 3–AR–2. Capacitor C6 provides DC isolation and in the described embodiment had a value of 0.04 microfarads.

When the called party answers, a relay 4–RT operates via the called station loop and its operation is locked on a secondary winding through a pair of normally open contacts 4–RT–12 and 3–ON–12. In addition, the operation of the relay 4–RT opens the ringing path to the called station 110*a* by opening a normally closed contact 4–RT–7 and provides an operate path for a relay 4–D through the station loop and normally open contacts 4–RT–5, 3–AR–12, 4–RT–7, and 3–AR–10.

Actuation of the relay 4–D provides talk battery to the called station 110*a* and operates the relay 3–DA through a normally open contact 4–D–10 and a normally closed contact 3–DA–9, as shown in FIG. 3. Operation of the relay 3–DA is held locked through normally open contacts 3–DA–9 and 3–ON1–4. The operation of the relay 3–DA completes the tip and ring connection between the calling station 111*a* and the called station 110*a*. The override trunk 116 remains in this status until the calling station 111*a* disconnects, at which time relay 4–S releases causing the sequential release of relays 3–ON and 3–ON1. Relays 3–ON and 3–ON1 released open all holding grounds and the circuit is restored to an idle condition.

1.9 Called Station Disconnects After Busy Override and Calling Station Remains Connected To remove the connection between the called station 110*a* and the third party station 112, following notification of the called station 110*a* that call override is to take place, the called station 110*a* goes on-hook briefly. By going on-hook relay 4–CHK releases and the called station 110*a* goes idle from its prior connection. The release of relay 4–CHK releases relay 3–CHKA which, in turn, causes an input to delay timer $\tau 1$ to be grounded through normally open contact 3–CT–6 and normally closed contact 3–CHKA–3. After approximately three seconds the delay timer $\tau 1$ produces an output which actuates relay 3–AR. As noted previously, the operation of relay 3–AR results in a ringing signal being applied to the called station 110*a* and a ringback signal being delivered to the calling station 111*a*. When the called station 110*a* goes off-hook relays 4–RT, 4–D, and 3–DA operate and the connection between the calling station 111*a* and the called station 110*a* is established.

The three second delay, as described above, gives the called station 110*a* a reasonable disconnect interval to remove the third party connection without requiring a ringback signal to be supplied to the called station 110*a*. Any time after the three second interval a ringback signal must be provided to the called station 110*a* and such a signal is provided by the override trunk circuit 116.

If the calling station 111*a* goes on-hook during the three second interval, relay 4–S releases initiating a disconnect by releasing relay 3–ON which, in turn, releases relay 3–ON1. Relays 3–ON and 3–ON1 released open all holding grounds and the circuit is restored to an idle condition.

A further advantage of the three second delay is that it allows a previously camped-on connection to the called station 110*a* to be cut through to the called station 110*a* when it goes idle. When this occurs relays 4–CHK and 3–CHKA reoperate and the override trunk 116 remains in an override status. Subsequent disconnection of the called station 110*a* from the camped-on station results in the override trunk 116 supplying a ringback signal to the called station 110*a* in the manner heretofore described.

1.10 Summary

In summary, circuitry for permitting a calling station 111*a* equipped with a class of service which allows calls to a busy entitled called station 110*a* to be overridden has been described. Implementation of call override is instituted by a switchhook flash at the calling station 111*a* in response to a busy signal and class of service determination of the called station 110*a*. The call override circuitry provides notification to all parties connected to the called station 110*a* that call override is to be initiated. Should a private connection between the called station 110*a* and the calling station 111*a* be desired, the called party can momentarily go on-hook, thereby releasing his connection to the third party station 112. Following this the called party automatically receives a ringback signal if he remains on-hook longer than a predetermined time interval and the calling station 111*a* continues to remain on the line.

In all cases it is to be understood that the above described embodiment is illustrative of but a small number of many possible specific embodiments which can represent applications of the principles of the invention. Thus, numerous and varied other embodiments can readily be devised in accordance with these principles by those skilled in the art without departing from the spirit and scope of the invention.

What is claimed is:

1. In a telephone switching system having a plurality of line circuits terminated in station sets, said line circuits being interconnectable to a plurality of trunk circuits through a multistage switching network, the invention comprising call override circuitry for completing a connection between a calling station and a called station said called station being busy as a result of a connection to a third station, said call override circuitry comprising means for determining a class of service provided to said calling station, means for detecting a busy condition of said called station, means for determining a class of service provided to said called station, and means for seizing said call override circuitry provided said calling station is equipped with a class of service permitting call override and said called station is equipped with a class of service allowing call override.

2. The telephone switching system in accordance with claim 1 wherein the call override circuitry further includes means, responsive to said seizing means, for supplying a special busy signal to said calling station, and
means, responsive to a switchhook flash from said calling station, for establishing call override connections between said calling and called stations.

3. The telephone switching system in accordance with claim 2 wherein the call override circuitry further includes
means, activated by said establishing means, for supplying a call override signal over said established connections to said calling and called stations for a predetermined time interval, and
means, activated upon termination of said call override signal, for establishing a talking path between said calling and called stations.

4. The telephone switching system in accordance with claim 2 wherein the call override trunk circuit further includes
means for monitoring the status of said called busy station,
means for detecting a return to an idle state by said called busy station prior to said switchhook flash by said calling station,
means for providing said called station with a ringing signal upon detection of said idle state, and
means for completing a through connection to said called station upon response of said called station to said ringing signal.

5. The telephone switching system in accordance with claim 1 wherein the call override trunk circuit further includes
means for alerting said third station for a predetermined time interval that the connection between said third station and said called station is to be overridden, and
means for controlling the duration of said predetermined time interval.

6. Circuitry for controlling the establishment of call override connections between a calling station having a class of service which entitles it to override established call connections and a busy called station having a class of service which permits calls to it to be overridden comprising
means, responsive to a call from said calling station to said called station, for detecting a busy condition of said called station, and
means, subsequently activated by said detecting means and responsive to a switchhook flash from said calling station, for establishing call connections between said calling station and said busy called station.

7. The call override circuitry in accordance with claim 6 further comprising
means, activated by said establishing means, for supplying a call override signal over said established connections to said calling and called stations for a predetermined time interval.

8. The call override circuitry in accordance with claim 7 further comprising
means, activated upon termination of said call override signal, for providing a talking path between said calling and called stations.

9. The call override circuitry in accordance with claim 7 wherein said established connections extend connections to another station connected on a prior call to said called station further comprising
means, responsive to a call disconnect signal from said called station which controls a release of call connections to said other station, for holding said seizure of said call override circuitry and said established connections to said calling and called stations for a predetermined time interval following said call disconnect signal.

10. The call override circuitry in accordance with claim 9 further comprising
means for supplying said call override signal over said extended established connections to said other station for said predetermined time interval.

* * * * *